United States Patent Office 3,245,932
Patented Apr. 12, 1966

3,245,932
WATER-SOLUBLE 2-DIMETHYLAMINO-ETHANOL SALTS OF ($C_1$–$C_2$)ALKYL ACRYLATE/ACRYLIC ACID OR METHACRYLIC ACID/HYDROXY-ALKYL-SUBSTITUTED ACRYLATE OR METHACRYLATE COPOLYMERS AND METHOD OF MAKING THEM
Frank J. Glavis, Rydal, Pa., and Eugene A. Hamori, Ithaca, N.Y., assignors to Rohm & Haas Company, Philadelphia, Pa., a corporation of Delaware
No Drawing. Filed May 12, 1965, Ser. No. 455,340
9 Claims. (Cl. 260—29.4)

This application is a continuation-in-part of our copending applications for United States Letters Patent Serial No. 843,641, filed April 1, 1959, now abandoned and Serial No. 199,242, filed June 1, 1962, now abandoned.

This invention relates to novel and advantageous water-soluble 2-dimethylamino-ethanol salts of addition copolymers derived from copolymers of certain acrylic acid esters with acrylic acid, methacrylic acid or the dimer of the latter and with hydroxyalkyl-substituted acrylate or methacrylate esters. It is particularly concerned with aqueous solutions of such copolymer salts which are adapted to provide films, coatings, and impregnants which are resistant to water as well as films, coatings, and impregnants which have controlled sensitivity to water as desired.

Copolymers of acrylic acid or methacrylic acid with an ester of either of these acids and the production of salts therefrom are known. For example, such copolymers containing about 15 to 40% by weight of the acid component are insoluble in water in the acid condition, but can be converted to water-soluble materials by neutralization with ammonia or an alkali metal hydroxide. In this fashion, suitable compositions can be produced for coating and impregnating purposes. These compositions are of aqueous character and have the advantages associated therewith including inexpensiveness of solvent and freedom from fire and health hazards often associated with organic solvents. However, the solutions of these salts are relatively high in viscosity so that they frequently must be diluted considerably and excessively in order to adapt them to the most common coating procedures. In addition, the coatings obtained after drying and heating them are generally sensitive to water and may sometimes be redispersed by treatment with water. When the amount of acid groups in the copolymer is reduced to about 7 to 10% by weight in order to reduce the sensitivity of the coatings obtained therefrom, the salts obtained by neutralization with ammonia and alkali metal hydroxides are either water-insoluble or have but limited solubility in water.

In accordance with the present invention, it has been discovered that water-soluble salts can be prepared from certain copolymers containing about 1 to 4% by weight of units containing carboxylic acid groups, and preferably 2 to 4% of such groups, by reaction with 2-(dimethylamino)-ethanol and a cosolvent as hereinafter defined. The salts obtained appear to form colloidal aggregates or micelles when in aqueous solution. Thus, a typical salt obtained in accordance with the present invention has been found to form micelles of about 500 Angstroms diameter (as determined from light-scattering and sedimentation measurements) when dissolved in water. The solutions of the copolymer salts are thus appropriately termed "colloidal solutions."

It is an object of the present invention to provide novel aqueous copolymer salt compositions comprising a copolymer containing a relatively low proportion of unesterified carboxylate groups which compositions have improved stability and form coatings having high resistance to moisture and improved gloss. Another object of the present invention is to provide improved aqueous compositions comprising salts of copolymers of acrylic acid, methacrylic acid, methacryloxypropionic acid, or methacryl-oxyisobutyric acid, which are soluble in water and have low viscosity therein even at relatively high concentrations. Other objects and advantages will be apparent from the description thereof hereinafter.

The copolymers that may be employed for the formation of the salts and aqueous compositions of the present invention are those water-insoluble copolymers, having a molecular weight between about 50,000 and 200,000, formed of a mixture of copolymerizable monomers selected from the group consisting of (1) mixtures consisting of
   (a) at least one ($C_1$–$C_2$)-alkyl acrylate,
   (b) 1 to 4% by weight of an acid of the formula $$H_2C=C-(CH_2)_{n-1}H$$
$$\quad\ \ |$$
$$\ \ \ COOH$$

in which $n$ is an integer having a value of 1 to 2, and
   (c) about 3 to 20% by weight of at least one compound selected from the group consisting of hydroxy-($C_2$–$C_4$)-alkyl esters of an acid of the aforesaid formula and ($C_1$–$C_2$)-alkyl esters of alpha-methylol acrylic acid, and
(2) mixtures consisting of
   (a) at least one ($C_1$–$C_2$)-alkyl acrylate,
   (b) about 1 to 4% by weight of an acid of the aforesaid formula,
   (c) about 3 to 20% by weight of at least one compound selected from the group consisting of hydroxy-($C_2$–$C_4$)-alkyl esters of an acid of the aforesaid formula and ($C_1$–$C_2$)-alkyl esters of alpha-methylol acrylic acid, and
   (d) up to 80% by weight of methyl methacrylate.

The acid copolymers used in the present invention should have a molecular weight from about 50,000 to 200,000, preferably in this range by viscosity average determination. In order to render the acid copolymers soluble in aqueous media for the purposes of the present invention, they are neutralized with 2-(dimethylamino)-ethanol. The copolymers may be prepared in a wide variety of ways. For example, they may be prepared by polymerization of the appropriate monomers in solution, or in aqueous media ending up in the latter case as a stable latex or dispersion. In some cases, it may be necessary to employ a chain-regulator in order to provide a molecular weight in the range desired. This is particularly the case when polymerizing in aqueous media. Examples of chain-regulators that may be employed include long-chain alkyl mercaptans, e.g., tertiary-dodecyl mercaptan of the formula $$H_3CC(CH_3)_2CH_2C(CH_3)_2CH_2C(CH_3)_2SH$$

isopropanol, isobutanol, long-chain alcohols, e.g., lauryl alcohol, tertiary-octyl alcohol, cumene, $CCl_4$, $C_2Cl_4$, and $CBrCl_3$. The amount of chain regulator that may be used depends upon the particular system and the conditions and may vary from 0 to 2% based on the weight of monomers. Generally, the use of 0.1 to 1% of bromotrichloromethane serves to provide as wide a range of molecular weights in aqueous media as is required.

While in the formation of the copolymer by emulsion copolymerization any suitable dispersant or emulsifier may be employed, it is preferable for the purposes of the present invention to use a salt of the present invention obtained from a previously-prepared batch as the dispersant in the system so that the coating composition is essentially uniform in character. The amount of such a dispersant that is used in such a latex polymerization may vary from about ½% to 6% on the weight of monomers. Commonly employed water-soluble free-radical initiators, such as the persulfates of ammonium, sodium, or potassium, or redox systems using tertiary-butyl hydroperoxide with a reducing agent such as isoascorbic acid, may be employed.

One preferred method of preparing the copolymers is by copolymerization of the appropriate monomers in an organic solvent. The presence of certain water-miscible solvents in the final special amine copolymer salt solution has been found to markedly improve the stability of aqueous solutions of the special amine salts, to improve the gloss of coatings obtained therefrom and to make it possible to use a wider variety of comonomers for special purposes as mentioned above. The useful solvents which are herein called "cosolvents" are soluble in water but not to such an extent that they remain essentially in the water phase to the substantial exclusion of entry into the polymer micelle. The useful cosolvents enter extensively into polymer micelle and, as a result, they show a noticeable thickening action which does not occur when the solvent remains practically entirely in the water phase. The cosolvent should be volatile so that it leaves the film or coating on air-drying and is practically all removed before baking to avoid blistering on baking. Of course, the volatility should not be so high that the flash point of the aqueous compositions is undesirably low. Suitable cosolvents are 2-butoxyethanol, 2-ethylhexyl alcohol, tertiary butanol, n-butanol, isopropanol, isophorone, butoxyethyl acetate, butoxyethoxyethyl acetate, ethoxyethyl acetate, and triethanolamine. If the polymer is prepared in other types of organic solvent, such as acetone, ethanol, or 2-ethoxyethanol, which are incapable of serving as cosolvents, the solvent used in preparation of the polymer may be removed before the acid polymer is neutralized with the amine to form the salt, since this type of solvent usually contributes no particular advantage or benefit to the final aqueous copolymer salt composition.

In order to form the salt of the acid copolymer, the acid copolymer is introduced into water, 2-(dimethylamino)-ethanol is added, and then the mixture may be heated with agitation at a temperature of about 40° to 80° C. for a period of about 15 minutes to 15 hours. Preferably, a temperature of 50° to 75° C. is used. However, in some cases and particularly with the low molecular weight polymers in finely-divided condition, the reaction with the amine requires no heat and is virtually instantaneous.

If the acid copolymer has been prepared in an aqueous medium, the amine may be added directly to the aqueous dispersion of the copolymer. However, in this case, it is often desirable to eliminate ionic constituents such as by treatment with an ion-exchange resin or by dialysis before adding the amine. Preferably, the copolymer is of reduced particle size to facilitate the reaction with the amine in forming the salt. When the copolymer has been produced by a solution method, it may be isolated from the solution before it is introduced into the water. However, in general, it has been found that the solvent need not be eliminated before introduction of the copolymer into the water. When the solvent used in the polymerization is one of the cosolvents mentioned, it improves the clarity and stability (against mechanical action and on storage under normal conditions) of the aqueous solution obtained with the amine when used in the appropriate amount and improves the gloss of the films or coatings obtained. For this purpose, the cosolvent, tertiary-butanol may be used in an amount of about 5 to 10% based on the total weight of solution.

The proportion of amine used may be about 1 to 6 equivalents of amine per equivalent of acid in the copolymer. Generally, a minimum of one equivalent of amine is needed and ordinarily, a maximum of 2 or 3 equivalents is most suitable. A typical composition may be composed of 150 to 500 parts of water per 100 parts of polymer, about 10 to 50 parts of cosolvent per 100 parts of polymer, and 1 to 2 equivalents of the amine, based on the content of acid component in the copolymer.

The acid copolymers of the present invention contain certain units in certain proportions as previously defined. The content of 1 to 4% acid-containing units and from 3 to 20% of hydroxyl-containing units both apparently cooperate in the solubilization by treatment with the dimethylaminoethanol. In general, after solubilization the pH of the aqueous system containing the solubilized copolymer has a pH in the range of 8.5 to 9.5. If insufficient amine is added to raise the pH to about 8.5 the shelf life of the composition becomes relatively short. Whereas if an excessive amount of amine is added whereby the pH of the system is raised above 9.5 the viscosity becomes excessive for systems having solids concentrations that are most suitable for coating and impregnating applications. By providing a relatively low proportion of acid groups in the copolymer along with a substantial proportion of hydroxyl-containing groups therein, the conversion of the copolymers into water-soluble salt molecules or micelles of colloidal dimensions is accomplished without encountering excessive viscosity. In general, the rheology of the copolymer salt solutions of the present invention is similar to that of an aqueous dispersion or latex of emulsion polymers in spite of the fact that the polymer is solubilized at least to provide in the solution polymer particles of colloidal size. While it is not intended to be limited to the theory or theories expressed herein, it is thought that the hydroxyl group of the copolymer and the hydroxyl group of the amine have some interaction with the cosolvent whereby these three components cooperate in solubilizing the copolymer which normally could not be effected by the mere neutralization of an acid copolymer containing only 1 to 4% of acid units therein by the use of ammonia. The solubilized salts of the present invention even at concentrations as high as 35% solids have practical viscosities adapting them for impregnating and coating purposes generally.

The aqueous solutions of the amine copolymer salts of the present invention may be employed for a wide variety of purposes. Thus, they may be employed for coating and impregnating paper, leather, wood, metals, glass, ceramics, concrete, asbestos-cement products such as boards and shingles thereof, and all sorts of textiles. In the application for textiles, they may be employed for backing rugs, for modifying the abrasion-resistance of all sorts of fabrics whether of woven, knitted, or non-woven character. They are useful for the bonding of fibers in non-woven fabrics in which embodiment the proportion of the copolymer salt may vary from 20 to 200% or more on the weight of fibers in the fabric. They are useful for the pigment-printing and dyeing of fabrics.

In the uses mentioned hereinabove, clear aqueous solutions may be employed for the purpose of producing clear, transparent products. On the other hand, pigments, dyes, and fillers may be incorporated in conventional amounts to impart any desired color or delustered effect that may be desired. The aqueous solutions of the salts, even at concentrations of 20 to 35%, are relatively non-viscous. Increase of the concentration beyond this point increases the viscosity, but the solutions of sprayable viscosity have adequate concentration to deposit a coating of substantial thickness on the order of 1 to 2 mils in a single spraying. The composition can be applied at any concentration from less than 1% up to 50 or 60% by weight, depending upon the particular purpose, the extent of penetration desired when absorbent or porous surfaces are involved, and the thickness of coating desired in any particular instance.

After application, the coatings may be dried simply by air-drying, that is exposure to the ambient atmosphere. Alternatively, they may be dried at elevated temperatures such as from 140° to 210° F. When dried while exposed to the ambient atmosphere, the coating generally do not have their full capacity to resist water and redispersion. However, coatings dried in this manner which are allowed to age at room temperature for a period of a week or more gradually acquire resistance to water. Coatings dried at elevated temperatures naturally have greater resistance to moisture at the completion of the drying. In all cases, a final curing by heating to elevated temperatures of 220° to 450° F. for periods of several minutes to one-half hour or so may be desired to impart the maximum resistance to water in the coatings in the shortest possible time. The aging or curing involves elimination of amine from the salt deposited.

The aqueous compositions containing the copolymer salts of the present invention can be modified with all sorts of other aqueous materials. For example, they may be mixed with aqueous dispersions of water-insoluble vinyl or acrylic polymers and especially with such dispersions obtained by the emulsion polymerization of acrylic acid, methacrylic acid, the esters, amides or nitriles of these acids, styrene, vinyltoluene, vinyl acetate, vinyl chloride, vinylidene chloride, and mixtures of any two or more of the foregoing monomers. They may be mixed with water-soluble condensation products of resin-forming character including phenol-formaldehyde resins, aminoplasts such as urea-formaldehyde resins, melamine-formaldehyde resins, ethyleneurea-formaldehyde resins, the alcohol-modified aminoplasts derived from the formaldehyde condensates just named and from methanol or ethanol, and polyepoxides of water-soluble or of water-dispersible character, especially the aliphatic diepoxides obtained by the condensation of epichlorohydrin with glycols or glycerol and available commercially under the trade names Araldite 297, Epon 582, and so on. They may be mixed with mixtures of the several other materials mentioned hereinabove. The proportions of the amine copolymer salts of the present invention employed with the other materials mentioned in this paragraph may range from 1 to 99% by weight of the tertiary amine salt to 99 to 1% respectively of any of the other materials.

Coatings and impregnations made with the aqueous systems containing a mixture of the amine salt of the water-insoluble copolymers with a thermosetting resin, such as an aminoplast or a poly(vic-epoxide) mentioned above, are characterized by good water resistance and solvent resistance. These mixtures, preferably containing about 10 to 30% of aminoplast or polyepoxide (based on copolymer), are therefore especially useful for the bonding of non-woven fabrics, pigment printing and dyeing, coating and impregnation of other textile fabrics as well as paper and leather.

Aqueous dispersions of water-insoluble vinyl or acrylic copolymers obtained by emulsion polymerization have come into extensive use for making water-base paints. It has been found that the preparation of water-base paints from mixtures of water-insoluble emulsion copolymers with the water-soluble salts of the present invention provides improved penetration of chalky surfaces by the paint so that such paints have better adhesion to chalky or dusty surfaces than the normal water-base paints formulated simply with water-insoluble emulsion copolymers. At the same time, excellent water-resistance is obtained in the film or coating deposited by the paint. This mixed-binder paint is thus extremely valuable for the repainting of surfaces carrying old chalked paints and for masonry surfaces having porous, chalky or dusty exterior, such as cement, concrete, stone, asbestos-cement shingles, etc. Mixtures containing the water-soluble salt of the present invention and the water-insoluble emulsion copolymer in which the two components are present in the ratio of 20:80 to 80:20 are preferred for this purpose.

In the examples which are illustrative of the present invention, the parts and percentages are by weight unless otherwise indicated.

*Example 1*

(a) *Preparation of acidic polymer in solution.*—A monomer mixture is prepared by combining the following materials:

| | Grams |
|---|---|
| Ethyl acrylate | 215 |
| Methyl methacrylate | 215 |
| β-Hydroxyethyl methacrylate | 55 |
| Methacrylate acid | 15 |
| 2-Ethoxyethanol | 108 |

To a glass reaction vessel, equipped with a reflux condenser, a Teflon paddle, and a dropping funnel and thermometer, there is charged 1390 grams of 2-ethoxyethanol. The contents of the flask are heated to a temperature of 75° C. by means of a water bath, and 3.75 grams of azodi-isobutytronitrile (AIBN) are added to the 2-ethoxyethanol immediately prior to the addition of one-quarter of the monomer mix, which amount is added over a period of about five minutes. With the batch temperature maintained at 75°±5° C. throughout, a second quarter of the monomer mix is added after 30 minutes; a third quarter after 60 minutes; and a fourth quarter after 90 minutes; with each addition requiring about five minutes. The batch temperature is maintained at 75° C. for an additional period of from three to fifteen hours, with 1.9 grams of AIBN added two hours after the start of the monomer addition, and 0.85 gram of AIBN added two hours later. The batch is cooled and passed through cheese cloth to remove any insoluble residues. Conversion to polymer is given by a solids analysis, which indicates that polymer has been formed in conversions of 99% or better.

(b) *Isolation of solution polymer.*—The 25% concentrate of polymer in 2-ethoxyethanol obtained from Example 1 (a) is diluted to 12.5% (although the exact dilution is not critical) with 2-ethoxyethanol or methanol. A five-gallon bucket is about half filled with an equal mixture of water and ice, and the mixture is agitated. The polymer solution is slowly added to the agitated ice-water mixture. An immediate precipitate forms. About one gallon of the polymer solution can be precipitated in this way. The ice-water mix is allowed to warm to room temperature and the precipitated polymer removed by filtration through a Büchner funnel fitted with coarse filter paper. Two to four successive washings with cold water remove all traces of solvent. The polymer is air-dried.

(c) *Solubilization of the isolated polymer.*—The polymer isolated as in (b) is solubilized in the following way. To a suitable digestion flask is charged the following:

| | Grams |
|---|---|
| Polymer | 100 |
| Water | 400 |
| Tert-butanol | 25 |
| Dimethylaminoethanol (1.5 equivalents) | 4.6 |

This mixture is well mixed and digested at 70–80° C. for a period of several hours. The resultant solution is clear and has a viscosity of 50–100 cps. at room temperature.

(d) *Preparation of clear coating composition.*—The following materials are mixed:

329.6 grams solution obtained in part (c)

15.6 grams water-soluble methoxylated melamine-formaldehyde resin (concentration 80%, ratio of methoxymethyl groups to melamine 2:1, methylol groups to melamine 1:1)

The solution is filtered through cheese-cloth and sprayed with a suction type spray gun on a degreased steel plate using 40–50 p.s.i. air pressure. With approximately 3 passes 1-mil thick films can be obtained. After 1 to 2 hours' drying in air at room temperature, films are baked for 30 minutes in a 150° C. oven. The coatings obtained with this procedure are smooth, water clear and adhere well to the substrate. When the coatings are exposed to water at room temperature for 1500 hours, no changes in appearance or adhesion can be seen.

(e) *Preparation of bonded non-woven fabrics.*—A non-woven fabric formed of a plurality of superposed carded webs of a mixture of cotton and rayon fibers is padded through the salt solution of part (c) diluted with water to a concentration of 8% by weight. The wet pick-up is 120% by weight. The impregnated fabric is then dried in air and heated at 150° C. for five minutes. The product is well unified and is useful as a pressure-sensitive adhesive tape backing. Thicker fibrous webs treated in similar fashion are useful as bibs, napkins, wiping cloths, and disposable diapers.

(f) *Preparation of pigmented coating composition.*—The following components are mixed and then digested for 16 hours at 70° to 80° C.:

| | Grams |
|---|---|
| Polymer obtained in Example 1 (b) | 526 |
| Water | 1312 |
| Tertiary-butanol | 131 |
| 2-dimethylaminoethanol | 31 |

After digestion, 526 grams $TiO_2$ pigment (rutile type) is added and the mixture is poured into ball-mill jars and milled for 18 or more hours. When the required degree of pigment dispersion is obtained, 165 grams of water-soluble melamine-formaldehyde resin (as described in Example 1 (d)) is added (80% in water).

After thorough mixing, the enamel is filtered through a double layer of cheese-cloth and the viscosity is reduced, by addition of water, to 50 cps. The spraying, air-drying, and baking procedures are the same as described in Example 1 (d). The coating obtained has a smooth white finish, properties of which are the same as those of the described coating in Example 1 (d). The floss of film measured by the "Photovolt" gloss meter is around 85 units.

*Example 2*

Similar coatings are obtained when parts (a) through (d) of Example 1 are repeated except that the tertiary butanol used in part (c) is replaced with 10 grams of 2-butoxyethanol and the amount of melamine resin solution used in part (d) is reduced to 3 grams.

*Example 3*

*Preparation of polymer in solution.*—The polymer of Example 1 (a) is prepared exactly as described except that an equal weight of dioxane is used instead of 2-ethoxyethanol wherever used. The polymer thus obtained is isolated as in Example 1 (b) and solubilized as in Example 1 (c).

*Example 4*

(a) *Preparation of the acidic polymer as an aqueous latex.*—A monomer mix is prepared from the following materials:

| | Grams |
|---|---|
| Ethyl acrylate | 430 |
| Methyl methacrylate | 430 |
| β-Hydroxypropyl methacrylate | 110 |
| Methacrylic acid | 30 |
| $CBrCl_3$ | 2.5 |

To a glass reaction vessel, equipped with reflux condenser, Teflon paddle, and an addition funnel and thermometer, is charged:

| | Grams |
|---|---|
| Water | 1708 |
| 10% aqueous solution of the dimethylaminoethanol-solubilized polymer of Example 1 (c) | 200 |

The charge to the flask is heated to 95° C. by means of a steam bath, and the monomer mix is added uniformly over a period of 30 to 45 minutes while, simultaneously and proportionately, a solution of 1.88 grams of ammonium persulfate in 100 ml. of water is added from a burette. During the simultaneous addition of monomer mix and initiator solution, the batch temperature is maintained above 90° C., and agitation is maintained at a fairly rapid rate (i.e., 100–400 r.p.m.). Heating is continued for one-half hour after the monomer addition is complete, and the batch is then cooled to room temperature for storage, or to 50° C. if solubilization is to be carried out immediately. The polymer latex, 33% polymer, is a white, opaque, smooth product with a viscosity of 10 to 20 cps. It is very stable.

(b) Separate 90-gram portions of the final polymer latex of part (a) is solubilized by mixing the 90-gram amount of latex obtained in part (a) with 1.0 gram of dimethylaminoethanol in $x$ grams of a water:cosolvent blend of $(100-y):y$ weight ratio and maintaining the mixture at 55° C. for two hours, the cosolvent and $x$ and $y$ being in the respective instances:

| | $x$ | $y$ |
|---|---|---|
| 1. Tert-butanol | 125 | 6 |
| 2. n-Butanol | 125 | 3 |
| 3. Isopropanol | 50 | 20 |
| 4. Isophorone | 100 | 10 |
| 5. 2-ethylhexanol | 100 | 3 |
| 6. 2-(butoxy)ethyl acetate | 110 | 5 |
| 7. 2-(butoxyethoxy)ethyl acetate | 80 | 5 |
| 8. Triethanolamine | 100 | 3 |
| 9. 2-butoxyethanol | 50 | 6 |

(c) A coating composition is prepared by mixing the following materials:

100 grams each of the solutions obtained in part (b) hereof 2.5 grams water-soluble methoxylated melamineformaldehyde resin (concentration 80%, ratio of methoxymethyl groups to melamine 2:1, methylol groups to melamine 1:1)

The compositions obtained are filtered through cheese-cloth and sprayed with a suction type spray gun on a degreased steel plate using 40–50 p.s.i. air pressure. With approximately 3 passes 1-mil thick films can be obtained. After 1 to 2 hours drying in air at room temperature, films are baked for 30 minutes in a 150° C. oven. The coatings obtained by this procedure are smooth, water clear and adhere well to the substrate. When the coatings are exposed to water at room temperature for 1500 hours, no changes in appearance or adhesion can be seen.

(d) A pigmented coating composition is prepared by mixing 140 grams of any one of the solutions of part (b) hereof with 22 grams of rutile $TiO_2$ pigment. The mixture is ball-milled 20 hours. Then 7.5 grams of dimethoxymethylmonomethylol-melamine (80% in water) is added. The thoroughly mixed enamel thus obtained is filtered through cheese-cloth and diluted with water to 100 cps. viscosity. The resulting solution is sprayed, dried in the air an hour or so, and baked 30 minutes at 150° C. A smooth white finish is obtained which adheres well to the substrate and has a "Photovolt" gloss reading of 85. When exposed to water at room temperature for 1500 hours, no loss in appearance or adhesion occur.

*Example 5*

Example 4 (a) is repeated replacing the β-hydroxypropyl methacrylate with 27.5 grams of ethyl (alpha-methylol)-acrylate. The polymer is solubilized by mixing it with 1.5 equivalents of dimethylaminoethanol and 20% by weight, on copolymer weight, of tert-butanol.

*Example 6*

The solution obtained in Example 5 is mixed with a water-soluble methoxymethylated melamine resin as in Example 1 (d) using 20% of the latter resin, based on the weight of copolymer. Coatings obtained therefrom are

We claim:

1. As a composition of matter, water, a water-soluble salt of 2-(dimethylamino)-ethanol with a water-insoluble copolymer, having a molecular weight of about 50,000 to 200,000, of a mixture of copolymerizable monomers selected from the group consisting of
   (1) mixtures consisting of
      (a) at least one $(C_1-C_2)$-alkyl acrylate,
      (b) 1 to 4% by weight of an acid of the formula

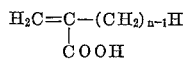

in which $n$ is an integer having a value of 1 to 2, and
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
   (2) mixtures consisting of
      (a) at least one $(C_1-C_2)$-alkyl acrylate,
      (b) about 1 to 4% by weight of an acid of the aforesaid formula,
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
      (d) up to 80% by weight of methyl methacrylate, and a cosolvent selected from the group consisting of isopropanol, n-butanol, tert-butanol, 2-ethylhexanol, 2-butoxyethanol, 2-butoxymethyl acetate, butoxyethoxyethyl acetate, ethoxyethoxyethyl acetate, isophorone, and triethanolamine.

2. A composition comprising water, a water-soluble thermosetting resin-forming aminoplast selected from the group consisting of urea-formaldehyde resins, melamine-formaldehyde resins, ethyleneurea-formaldehyde resins, and their $(C_1-C_2)$-alcohol-modified condensates and a water-soluble salt of 2-(dimethylamino)-ethanol with a water-insoluble copolymer, having a molecular weight of about 50,000 to 200,000, of a mixture of copolymerizable monomers selected from the group consisting of
   (1) mixtures consisting of
      (a) at least one $(C_1-C_2)$-alkyl acrylate,
      (b) 1 to 4% by weight of an acid of the formula

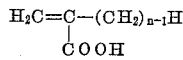

in which $n$ is an integer having a value of 1 to 2, and
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
   (2) mixtures consisting of
      (a) at least one $(C_1-C_2)$-alkyl acrylate,
      (b) about 1 to 4% by weight of an acid of the aforesaid formula,
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
      (d) up to 80% by weight of methyl methacrylate, and a cosolvent selected from the group consisting of isopropanol, n-butanol, tert-butanol, 2-ethylhexanol, 2-butoxyethanol, 2-butoxymethyl acetate, butoxyethoxyethyl acetate, ethoxyethoxyethyl acetate, isophorone, and triethanolamine.

3. A composition comprising water, a water-soluble melamine-formaldehyde condensate and a water-soluble salt of 2-(dimethylamino)-ethanol with a water-insoluble copolymer, having a molecular weight of about 50,000 to 200,000, of a mixture of copolymerizable monomers selected from the group consisting of
   (1) mixtures consisting of
      (a) at least one $(C_1-C_2)$-alkyl acrylate
      (b) 1 to 4% by weight of an acid of the formula

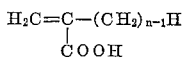

in which $n$ is an integer having a value of 1 to 2, and
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
   (2) mixtures consisting of
      (a) at least one $(C_1-C_2)$-alkyl acrylate,
      (b) about 1 to 4% by weight of an acid of the aforesaid formula,
      (c) about 3 to 20% by weight of at least one compound selected from the group consisting of hydroxy-$(C_2-C_4)$-alkyl esters of an acid of the aforesaid formula and $(C_1-C_2)$-alkyl esters of alpha-methylol acrylic acid, and
      (d) up to 80% by weight of methyl methacrylate, and a cosolvent selected from the group consisting of isopropanol, n-butanol, tert-butanol, 2-ethylhexanol, 2-butoxyethanol, 2-butoxymethyl acetate, butoxyethoxyethyl acetate, ethoxyethoxyethyl acetate, isophorone, and triethanolamine.

4. As a composition of matter, an aqueous solution of (1) a water-soluble salt of 2-(dimethylamino)-ethanol with a water-soluble copolymer of about 1 to 4% by weight of methacrylic acid, 3 to 20% by weight of β-hydroxypropyl methacrylate, up to 80% by weight of methyl methacrylate, and ethyl acrylate to make 100%, and (2) a cosolvent selected from the group consisting of isopropanol, n-butanol, tert-butanol, 2-ethylhexanol, 2-butoxyethanol, 2-butoxyethyl acetate, butoxyethoxyethyl acetate, ethoxyethoxyethyl acetate, isophorone, and triethanolamine.

5. As a composition of matter, an aqueous solution of tert-butanol and a water-soluble salt of 2-(dimethylamino)-ethanol with a water-insoluble copolymer of about 1 to 4% by weight of methacrylic acid, 3 to 20% by weight of β-hydroxypropyl methacrylate, up to 80% by weight of methyl methacrylate, and ethyl acrylate to make 100%.

6. As a composition of matter, an aqueous solution of 2-butoxyethanol and a water-soluble salt of 2-(dimethylamino)-ethanol with a water-insoluble copolymer of about 1 to 4% of weight of methacrylic acid, 3 to 20% by weight of β-hydroxypropyl methacrylate, up to 80% by weight of methyl methacrylate, and ethyl acry- 7. As a composition of matter, an aqueous solution of a melamine-formaldehyde condensate, a water-soluble salt of 2-(dimethylamino)-ethanol with a water-insoluble copolymer of about 1 to 4% by weight of methacrylic acid, 3 to 20% by weight of β-hydroxypropyl methacrylate, up to 80% by weight of methyl methacrylate, and ethyl acrylate to make 100%, and tert-butanol.

8. As a composition of matter, an aqueous solution of a melamine-formaldehyde condensate, a water soluble salt of 2-(dimethylamino)-ethanol with a water insoluble copolymer of about 1 to 4% by weight of methacrylic acid, 3 to 20% by weight of β-hydroxypropyl methacrylate, up to 80% by weight of methyl methacrylate, and ethyl acrylate to make 100%, and 2-butoxyethanol.

9. A method of producing an aqueous solution of a water-soluble salt of a water-insoluble copolymer, having a molecular weight of about 50,000 to 200,000, of a mixture of copolymerizable monomers selected from the group consisting of (1) mixtures consisting of
 (a) at least one ($C_1$–$C_2$)-alkyl acrylate,
 (b) 1 to 4% by weight of an acid of the formula

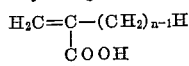

in which $n$ is an integer having a value of 1 to 2, and
 (c) about 3 to 20% by weight of at least one compound selected from the group consisting of hydroxy-($C_2$–$C_4$)-alkyl esters of an acid of the aforesaid formula and ($C_1$–$C_2$)-alkyl esters of alpha-methylol acrylic acid, and (2) mixtures consisting of
 (a) at least one ($C_1$–$C_2$)-alkyl acrylate,
 (b) about 1 to 4% by weight of an acid of the aforesaid formula,
 (c) about 3 to 20% by weight of at least one compound selected from the group consisting of hydroxy-($C_2$–$C_4$)-alkyl esters of an acid of the aforesaid formula and ($C_1$–$C_2$)-alkyl esters of alpha-methylol acrylic acid, and (d) up to 80% by weight of methyl methacrylate, which comprises mixing the acid copolymer with water, 2-(dimethylamino)-ethanol, the amount of amine being from 1 to 6 equivalents for each equivalent of acid in the copolymer, and a cosolvent selected from the group consisting of isopanol, n-butanol, tert-butanol, 2-ethylhexanol, 2-butoxyethanol, 2-butoxyethyl acetate, butoxyethoxyethyl acetate, ethoxyethoxyethyl acetate, isophorone, and triethanolamine, and heating the mixture at 40° to 80° C. for about 15 minutes to 15 hours until a substantially clear solution is obtained.

References Cited by the Examiner

UNITED STATES PATENTS

| | | | |
|---|---|---|---|
| 2,702,796 | 2/1955 | Fine | 260—29.6 |
| 2,819,237 | 1/1958 | Daniel | 260—29.4 |
| 2,906,724 | 9/1959 | Daniel | 260—29.4 |
| 2,918,391 | 12/1959 | Hornibrook | 260—29.4 |

MURRAY TILLMAN, *Primary Examiner.*